(12) United States Patent
Ito et al.

(10) Patent No.: US 6,951,417 B2
(45) Date of Patent: Oct. 4, 2005

(54) HEADLIGHT APPARATUS

(75) Inventors: Masamoto Ito, Saitama (JP); Kenji Tamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 39 days.

(21) Appl. No.: 10/645,495

(22) Filed: Aug. 22, 2003

(65) Prior Publication Data

US 2004/0109325 A1 Jun. 10, 2004

(30) Foreign Application Priority Data

Aug. 26, 2002 (JP) ........................................ 2002-245858

(51) Int. Cl.[7] ................................................ B60Q 1/00
(52) U.S. Cl. ........................ 362/547; 362/373; 362/473
(58) Field of Search ................................ 362/473–476, 362/294, 547, 373, 507

(56) References Cited

U.S. PATENT DOCUMENTS

| 5,113,320 | A | * | 5/1992 | Haydu | 362/549 |
|---|---|---|---|---|---|
| 6,224,247 | B1 | * | 5/2001 | Ashizawa | 362/547 |
| 6,419,382 | B1 | * | 7/2002 | Nakagawa et al. | 362/547 |
| 6,497,507 | B1 | * | 12/2002 | Weber | 362/547 |
| 6,676,283 | B2 | * | 1/2004 | Ozawa et al. | 362/547 |

* cited by examiner

*Primary Examiner*—Ali Alavi
(74) *Attorney, Agent, or Firm*—Birch, Stewart, Kolasch & Birch, LLP

(57) ABSTRACT

A headlight apparatus includes a headlight unit accommodating headlight bulbs, and a headlight case in which an upper case is detachably mounted to a lower case attached to a stay that is secured to a link type front suspension of a motorcycle with the headlight unit being secured to the lower case. Air intake ports for introducing air into the headlight case are formed on the bottom of the lower case with an exhaust port for discharging air in the headlight case being formed on the rear end of the upper case. A gap is provided between the headlight case and the headlight unit that serves as an introduction passage for introducing air from the intake ports to the exhaust port.

20 Claims, 10 Drawing Sheets

HEADLIGHT APPARATUS

CROSS-REFERENCE TO RELATED APPLICATIONS

The present application claims priority under 35 USC 119 to Japanese Patent Application No. 2002-245858 filed on Aug. 26, 2002 the entire contents thereof are hereby incorporated by reference.

1. Field of the Invention

The present invention relates to a headlight apparatus that is mounted on the front face portion of a two-wheeler such as a motorcycle.

2. Description of the Background Art

In the prior art, for example, JP-A-11-208554 a construction is disclosed in which a plurality of intake ports are provided on a covering member such as an upper cowl and the like that is attached to the top of the front face of the vehicle body of the motorcycle so as to cover a handle, instruments and the like. A headlight is disposed in the vicinity of an air introduction path that supplies air introduced from the intake ports through an intake pipe for supercharging an engine or cooling a heat exchanger.

However, in the construction disclosed in the above-described publication, the intake ports are formed in the vicinity of the headlight on a front cowl so that the headlight is cooled by outside air introduced therethrough, and the side surface of the headlight can be cooled only in one direction in such a construction. Therefore the cooling efficiency of the headlight may be lowered.

In addition, when replacing an expended head bulb, a headlight unit must be removed from the upper cowl, which is a very troublesome procedure. In addition, there is another problem in that a procedure for adjusting the aiming of the headlight is also troublesome and takes a long time.

In view of such circumstances, it is an object of the present invention to provide a headlight apparatus in which the headlight can be cooled effectively, and the appearance thereof may be improved.

SUMMARY AND OBJECTS OF THE INVENTION

In order to achieve the above-identified object, the present invention provides a headlight apparatus including a headlight unit having a head light bulb stored therein, and a headlight case attached on a front frame of a two-wheeler for accommodating the head light unit therein. The headlight case includes a intake port for introducing air into the headlight case and an exhaust port formed at a position remote from the intake port for exhausting air from the headlight case. The headlight case encloses the headlight unit in close vicinity thereto with a gap between the headlight case and the headlight unit that forms an air introduction path for introducing air from the intake port to the exhaust port.

According to the headlight apparatus, air introduced from the intake port into the headlight case cools the outside of the headlight unit while passing through the air introduction path formed by the gap between the headlight case and the headlight unit and being exhausted from the exhaust port outside the headlight case, whereby heat generated by the headlight bulb or the like is effectively removed. In this case, since outside air taken into the headlight case passes along the entire surface of the outer periphery of the headlight unit and is discharged from the exhaust port, the outer periphery of the headlight unit is cooled extensively, and thus cooling efficiency of the headlight is improved.

A headlight apparatus according to the present invention provides a headlight case that is constructed of two halves including an upper case and a lower case.

In this headlight apparatus, the upper case is dismounted from the lower case when performing works such as the replacement of the headlight unit, aiming adjustment, and the like.

A headlight apparatus according to the present invention provides a headlight unit that is mounted to the lower case by being inserted through an opening formed on the top thereof.

In this headlight apparatus, the headlight unit is mounted to and dismounted from the lower case from above thereof in a state in which the upper case is dismounted from the lower case.

A headlight apparatus according to the present invention provides an intake port that is formed on the bottom of the headlight case, and the exhaust port is formed on a mounting portion on the upper portion of the headlight case for mounting the same to the front frame.

In the headlight apparatus of the present invention, the intake port and the exhaust port are not locate at positions that are noticeable when viewed from the outside. Thus, the appearance of the apparatus is maintained in a preferable state.

A headlight apparatus according to the present invention provides an exhaust port that is formed substantially at a position facing the intake port on the headlight case.

In this headlight apparatus, outside air introduced through the intake port can easily be exhausted from the exhaust port along the entire outer periphery of the headlight case.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
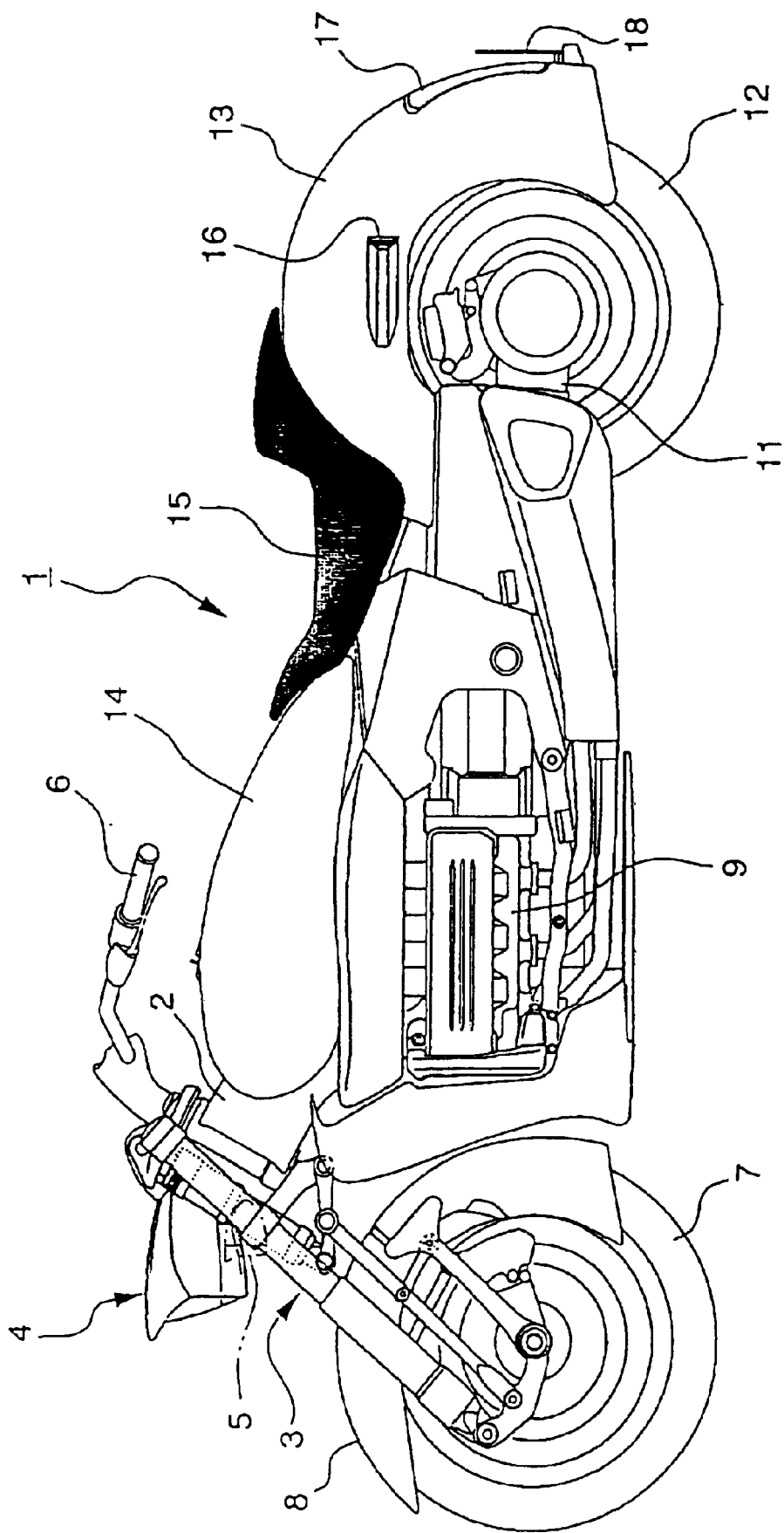
FIG. 1 is a side view showing a motorcycle provided with a headlight apparatus according to an embodiment of the present invention.

Referring now to the drawings, a headlight apparatus according to an embodiment of the present invention will be described. In the description, designations of directions such as front, rear, left and right are referenced to a vehicle body of a motorcycle 1 having a headlight apparatus according to an embodiment of the present invention.

Figure 2:
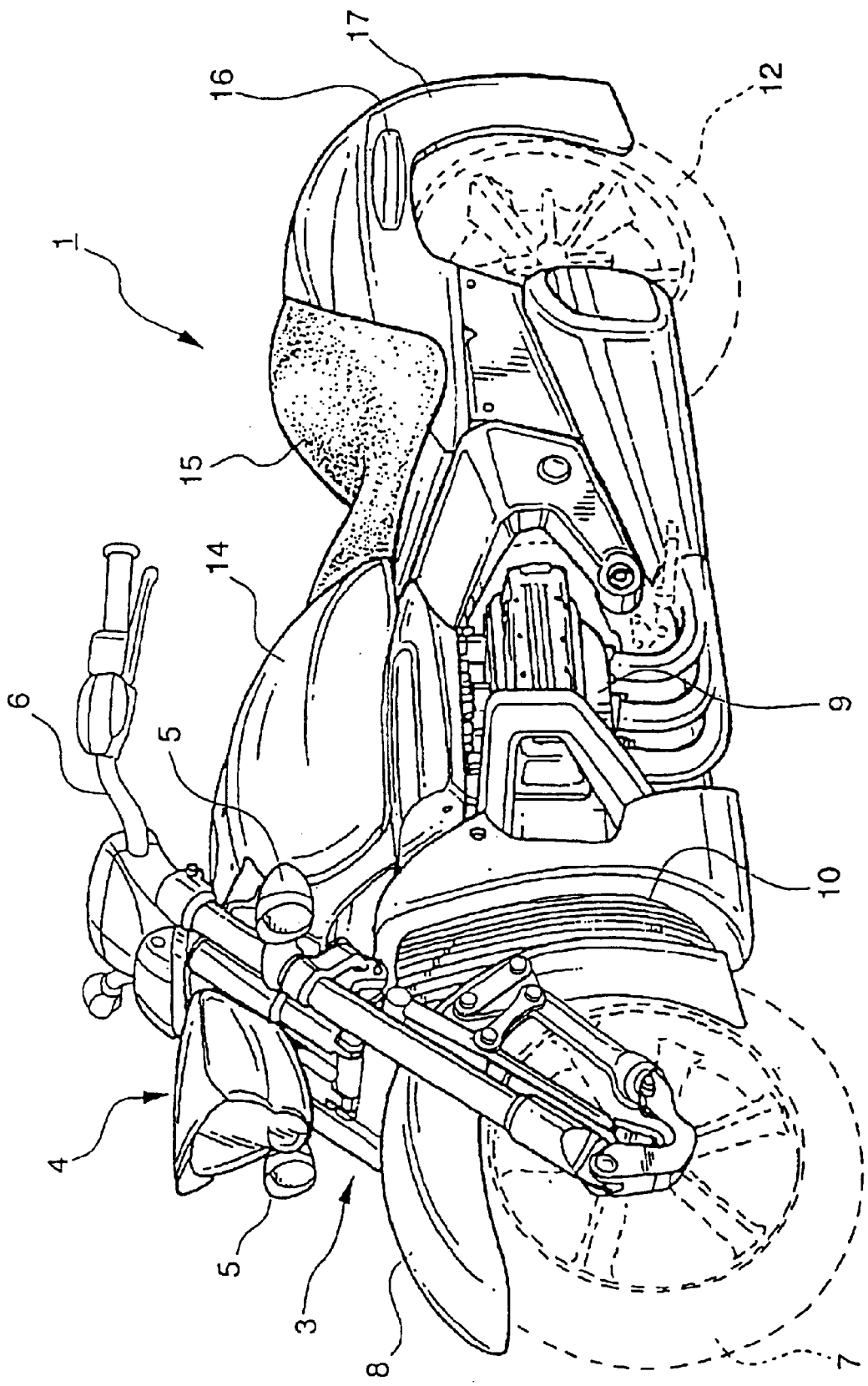
FIG. 2 is a perspective view of the same motorcycle.

Referring first to FIG. 1 and FIG. 2, a general structure of the motorcycle 1 will be described.

The motorcycle (two-wheeler) 1 is of, the so-called, American type, that includes a vehicle body frame 2, a link type front suspension (front suspension) 3 rotatably supported at the front end of the vehicle body frame 2, a headlight apparatus 4 provided on top of the link type front suspension 3, a pair of left and right front turn signals 5 provided on the link type front suspension 3 below the headlight apparatus 4, and a steering handle 6 mounted to the upper end of the link type front suspension 3 and arranged on top of the front portion of the vehicle body.

The motorcycle 1 includes a front wheel 7 rotatably supported by the link type front suspension 3 with a front fender 8 supported by the link type front suspension 3 for covering the upper side of the front wheel 7. An engine 9 is supported by the vehicle body frame 2 and a radiator 10 is disposed forwardly of the engine 9. A rear swing arm portion 11 is provided at the rear portion of the vehicle body so as to be pivotable about the lateral axis of rotation by the vehicle body frame 2 with a rear wheel 12 rotatably suspended at the rear end of the rear swing arm portion 11 and rotated by a driving force of the engine 9. A rear fender 13 is supported by the rear frame 2 for covering the upper side of the rear wheel 12.

Moreover, the motorcycle 1 includes a teardrop-shaped fuel tank 14 disposed on the upper portion of the vehicle body frame 2 with a main seat 15 disposed behind the fuel tank 14, on which the rider sits. Left and right rear turn signals 16 are disposed at the rear portion of the rear fender 13. A brake lamp 17 is provided at the center of the rear portion of the rear fender 13 with a license plate 18 attached at the rear end of the rear fender 13.

Referring now to FIG. 3 to FIG. 11, the headlight apparatus 4 according to an embodiment of the present invention will be described.

The headlight apparatus 4 includes a headlight unit 21 accommodating two, that is, upper and lower headlight bulbs 20a, 20b therein, and a headlight case 22 accommodating the headlight unit 21 therein.

Figure 4:
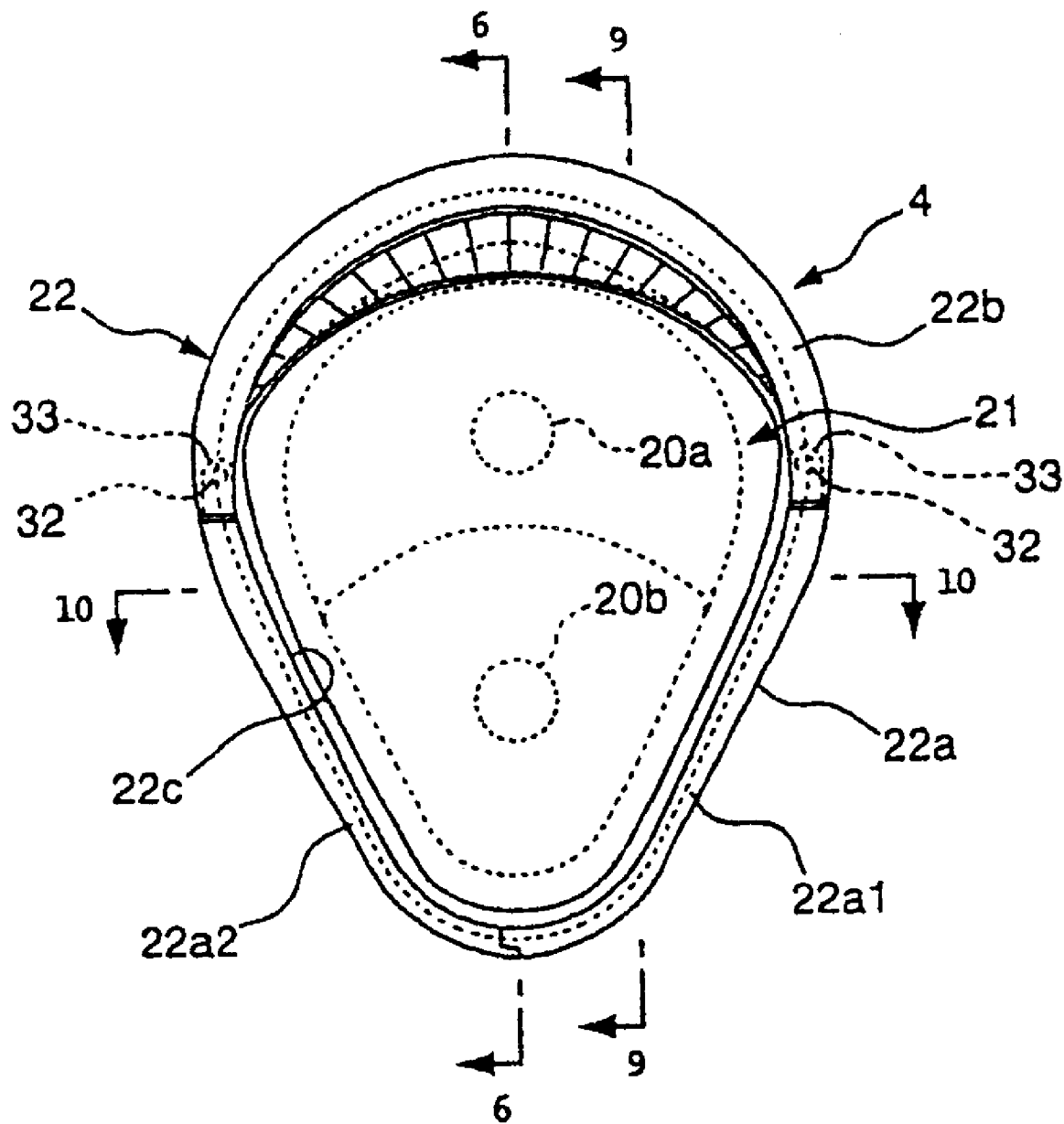
FIG. 4 is a drawing of the apparatus of FIG. 3 viewed in the direction indicated by an arrow A.

The headlight case 22 is, as shown in FIG. 4, divided into two halves including a lower case 22a having an inverted triangular shape of which an apex (lower end) has a downwardly convexed arcuate shape of a small diameter and the upper end is opened upwardly in the front view (lateral cross-section), and an upper case 22b bent into an arcuate shape of a large diameter projecting upwardly and opened downwardly in the front view (lateral cross-section). These cases are joined so that the opened sides face toward each other, and are formed generally into a generally inverted triangle shape having the upper and lower ends of arcuate shapes having larger and smaller diameters in the front view (lateral cross-section), respectively. The lateral cross-section is gradually reduced from an opening 22c on the front side, which is opened into an inverted triangular shape like the case described above, toward a closed portion 22d at the rear end.

Figure 3:
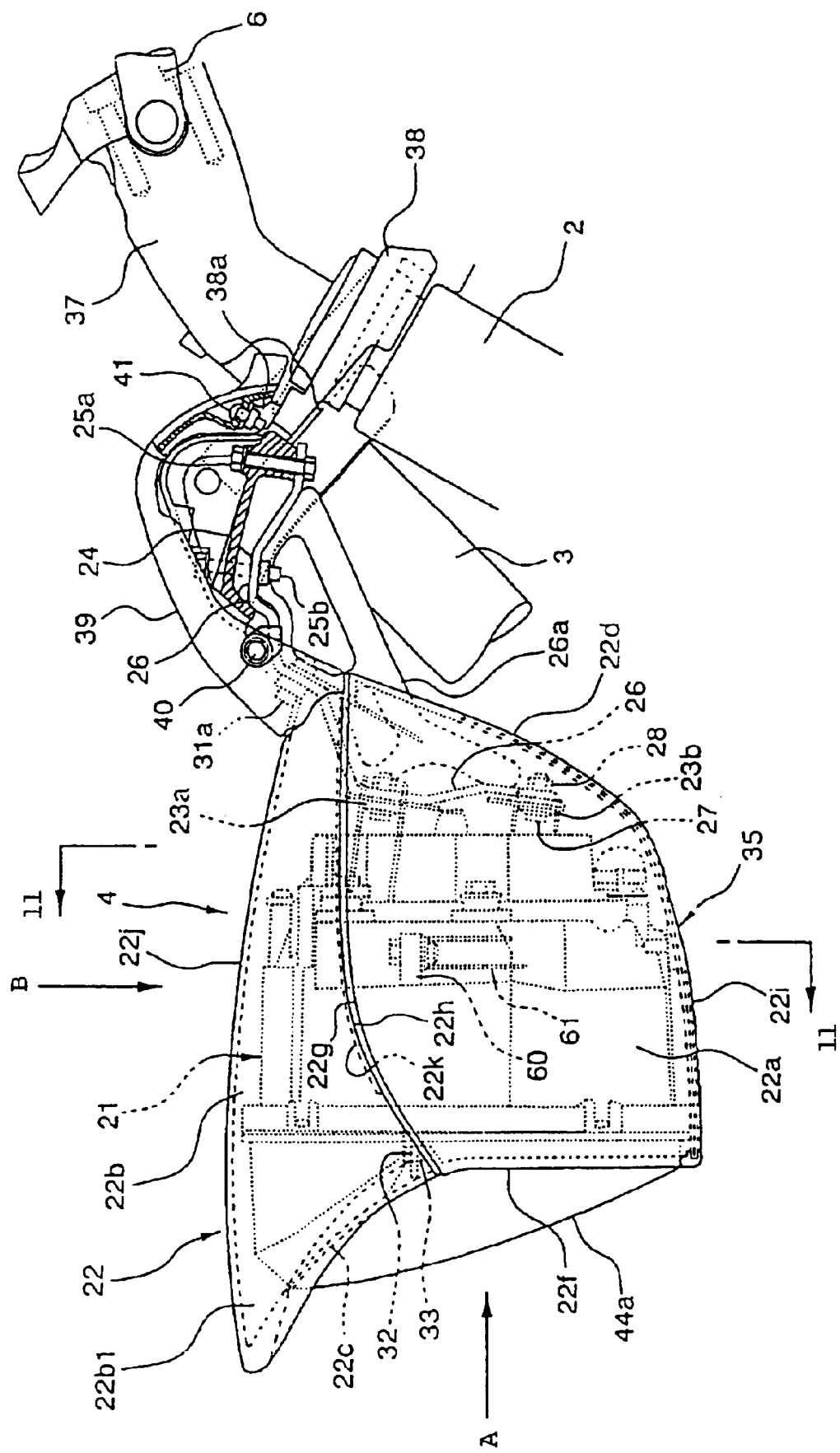
FIG. 3 is a partly cross-sectional side view of the headlight apparatus according to an embodiment of the present invention.
Figure 5:
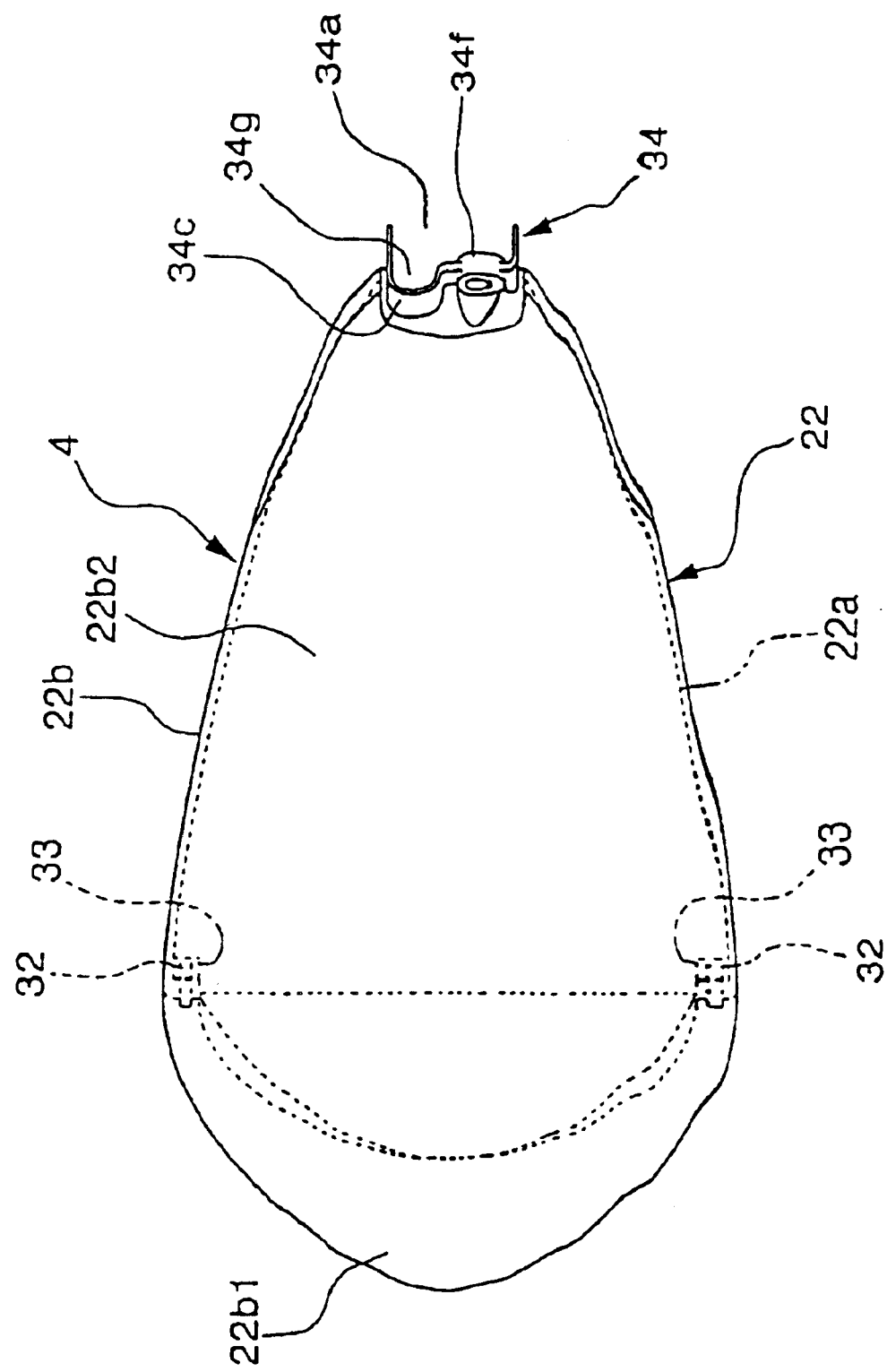
FIG. 5 is a drawing of the apparatus of FIG. 3 viewed in the direction indicated by an arrow B.

The upper side of a front portion 21b1 of the upper case 22b projects forward like an appentice from a vertically extending front end 22f of the lower case 22b in side view, as shown in FIG. 3, and is formed generally into a substantially egg shape when viewed in a plan view in which the front end is substantially an arcuate shape (rounded laterally elongated triangular shape). A rear potion 22b2 is a rounded narrow triangular shape as shown in FIG. 5. An upper side 22g of the lower case 22a and a lower side 22h of the upper case 22b are formed to extend in parallel along a gently and upwardly convexed curve while rising from the front side to the rear side. A bottom surface 22i of the lower case 22a and the closed portion 22d are both formed into a gently and outwardly convexed shape. An upper surface of the upper case 22b is formed into a gently and upwardly convexed curve. The upper side 22g of the lower case 22a is provided with a tongue portion 22k therealong so as to overlap the inside the lower side of the upper case 22b.

Figure 6:
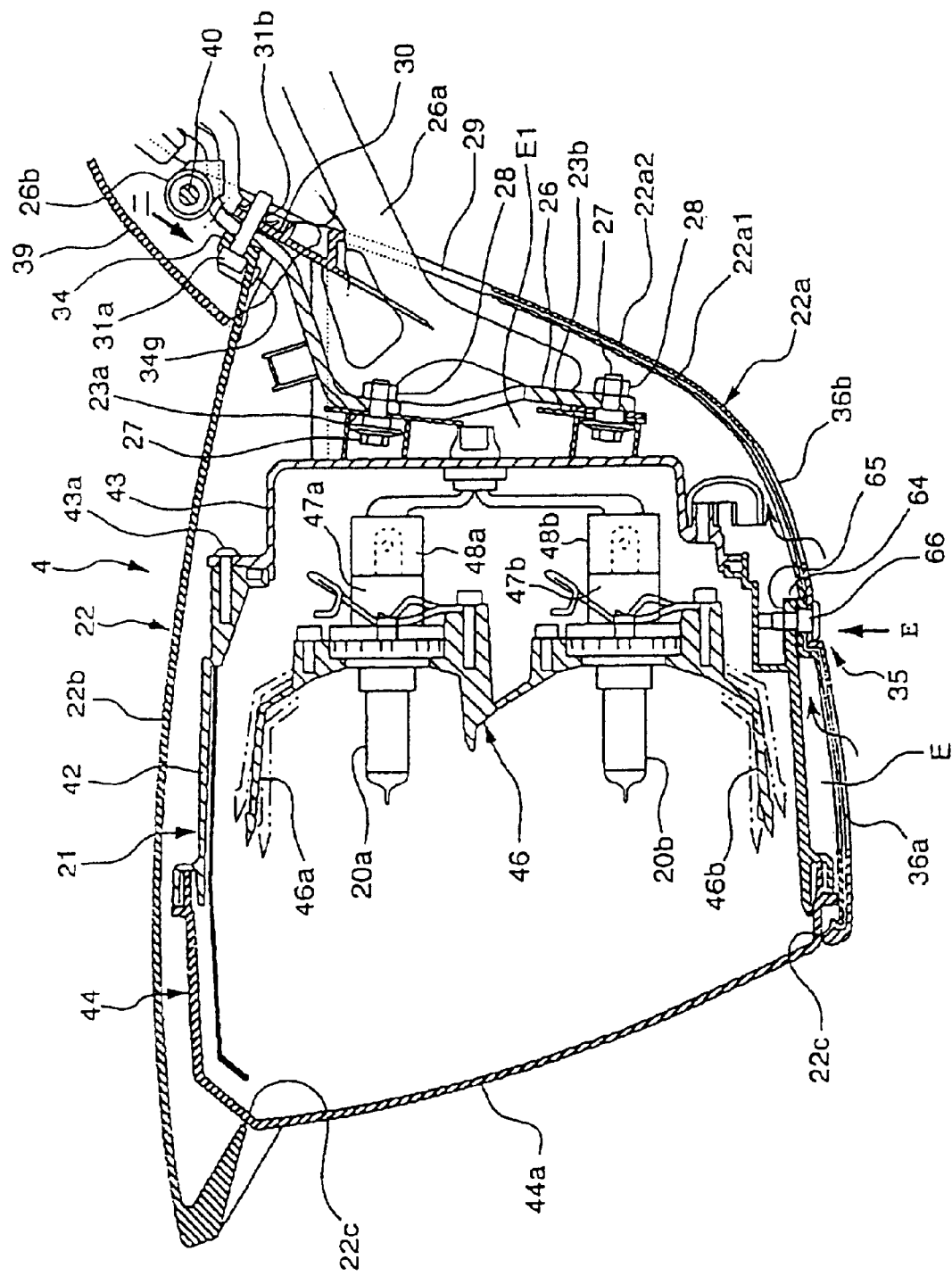
FIG. 6 is an enlarged cross-sectional view taken along the line 6—6 in FIG. 4.

The lower case 22a is, as shown in FIG. 3, FIG. 4, and FIG. 6, constructed of two halves 22a1, 22a2 divided along the laterally center thereof in a front view and adhered after applying adhesives on the mating surfaces of the thinned portions along the parting line, and fixed by a bolt 27 and a nut 28 to a stay 26 on which a plurality of mounting plates 23a, 23b (two on the left and right on the upper side and one on the lower side) are formed so as to project inwardly from the inner wall surface of the rear end and fixed on an upper bracket (front frame) 24 attached on the upper end of the link type front suspension 3 by bolts 25a, 25b. The rear end of the lower case 22a includes a slit 29, through which a reinforcing member 26a is provided vertically to the stay 26 that passes through, and a mounting strip 30 projecting upward. The mounting strip 30 is secured to the longitudinal mid-section of the stay 26 with a bolt 31a and a nut 31b.

Figure 7:
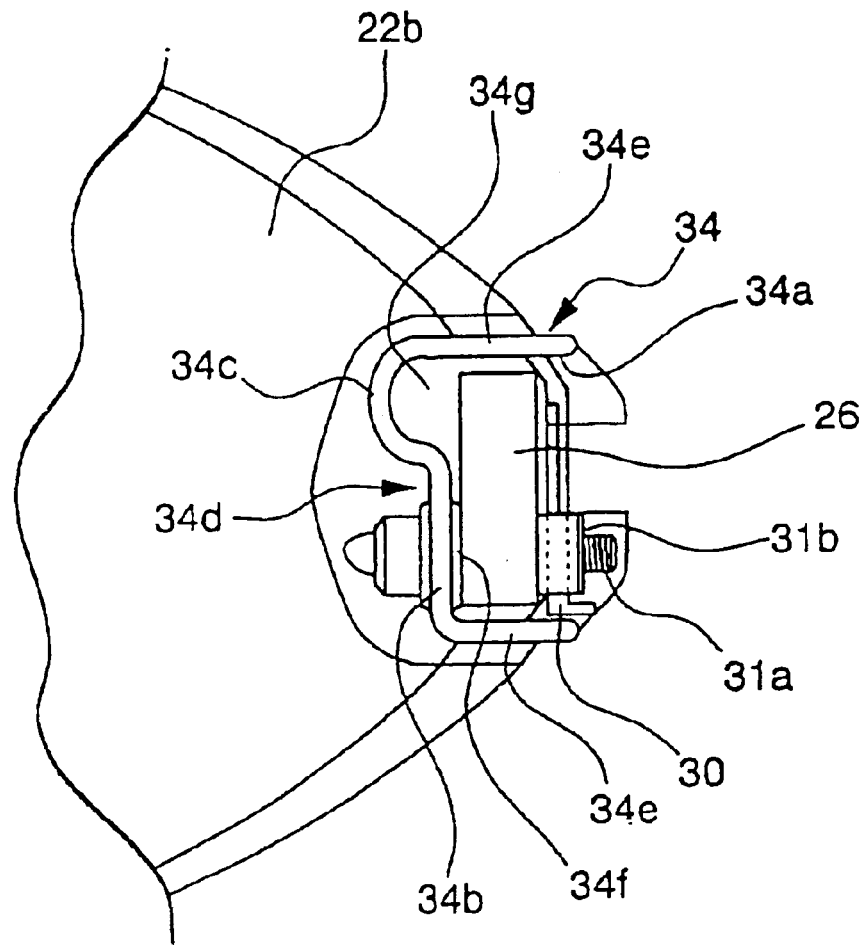
FIG. 7 is a drawing of the apparatus of FIG. 6 viewed in the direction indicated by an arrow D.

The upper case 22b has pins 32, 32 at the front ends of both of the lower sides 22g, 22g so as to extend horizontally rearwardly. The pins 32, 32 are inserted into pinholes on projecting strips 33, 33 provided at the front end of the lower case 22a so as to project upwardly, and the front end side of the upper case 22b is fixed to the front end of the lower case 22a. The rear end of the upper case 22b is formed with a mounting portion 34 so as to project upward as shown in FIG. 5 and FIG. 7. The mounting portion 34 includes an opening 34a at the rear end, and is formed into a square cylindrical shape having side walls 34e, 34e on both sides of a front wall 34d having a flat portion 34b and a forwardly projecting arcuate portion 34c. The mounting portion 34 is fixed to the stay 26 by inserting the stay 26 therein through the opening 34a and is secured with the bolt 31a and the nut 31b together with the mounting strip 30 of the lower case 22a while abutting a mounting seat 34f of the flat portion 34b against the front face of the stay 26. Accordingly, the upper case 22b is detachable with respect to the lower case 22a.

Figure 8:
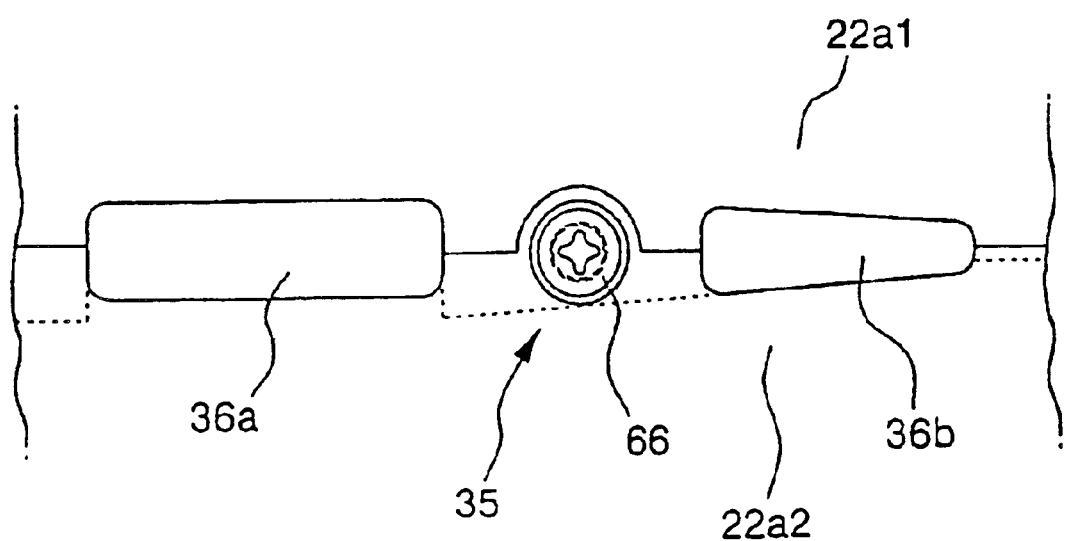
FIG. 8 is a drawing of the apparatus of FIG. 6 viewed in the direction indicated by an arrow E.

The lower case 22a is formed with longitudinally elongated intake ports 36a, 36b for mounting the headlight unit 21 provided on the bottom thereof to the lower case 22a, at the front and rear of a later-described mounting portion 35 as shown in FIG. 6 and FIG. 8. The intake ports 36a, 36b are connected to an exhaust port 34g provided between the arcuate portion 34c of the mounting portion 34 on the upper case 22b and the stay 26 through a gap E between the headlight case 22 and the headlight unit 21. The gap E serves as an air introduction path introducing air from the air intake ports 26a, 26b to the exhaust port 34g.

A top bridge (front frame) 38, to which a handle bracket 37 attached with the handle 6 is secured, is mounted to the upper end of the link type front suspension 3. A cover 39 is provided for covering the top bridge 38, the upper bracket 24, and the upper portion of the front face of the stay 26. The cover 39 is fixed to a supporting strip 26b that is secured by a bolt 40 to the stay 26, so that the front end thereof covers the outside of the mounting portion 34 in a state in which the exhaust port 34g of the mounting portion 34 of the upper cover 22b is opened, and the rear end is fixed by a screw nut 41 to a supporting strip 38a that is secured to the top bridge 38.

The headlight unit 21 includes, as shown in FIG. 6, and FIG. 9 to FIG. 11, a cylindrical housing 42 having the same shape as the headlight cover 22 in the front view (lateral cross-section). A rear cover 43 is secured by a screw nut 43a to the rear end of the housing 42 so as to close the opening thereof. A lens 44 having the same shape as the headlight cover 22 in the front view (lateral cross-section), is mounted to the front end of the housing 42, and includes a lens surface 44a facing slightly downwardly. A reflector 46 is supported by the headlight cover 22 via an aiming adjusting unit 45, wherein the headlight bulbs 20a, 20b are attached to a pair of upper and lower reflecting portions 46a, 46b of the reflector 46 via sockets 47a, 47b respectively. Wiring introduced inwardly from the rear face of the rear cover 43 is connected to the sockets 47a, 47b via connectors 48a, 48b. Though it is not shown in the figures, the wiring is bundled into a code with wirings for light control of the headlight unit 21, and is connected to a power source, control equipment, and the like through the cover 39.

The aiming adjusting unit 45 includes means for supporting the reflector 46 on the rear cover 43 and for adjusting the direction of irradiation of the headlight bulbs 20a, 20b, and is provided with a first aiming adjusting unit 45A for adjusting the direction of irradiation in the vertical direction and a second aiming adjusting unit 45B for adjusting the direction of irradiation in the lateral direction.

Figure 9:
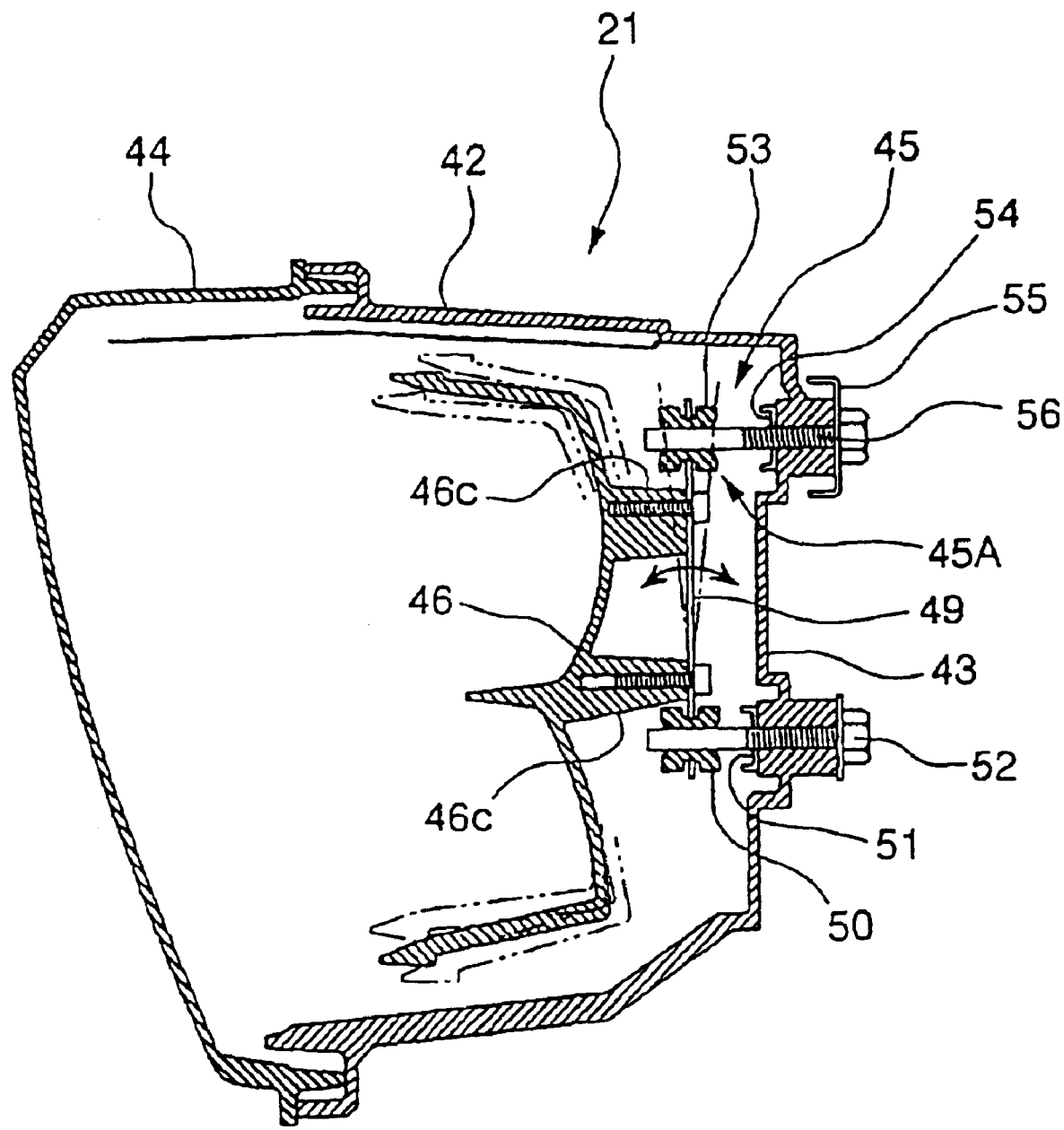
FIG. 9 is an enlarged cross-sectional view taken along the line 9—9 in FIG. 4.

The first aiming adjusting unit 45A is constructed in such a manner that, as shown in FIG. 9, a first stay 49 is fixed to upper and lower projections 46c, 46c formed on one side (the right side in FIG. 10) of the rear face of the reflector 46 with bolts. A supporting nut 50 is fixed to the lower end of the first stay 49 and is supported by a supporting bolt 52 passed horizontally through the lower position of the rear cover 43 and is secured with a nut 51. A first movable nut 53 is secured to the upper end of the first stay 49 and is engaged with the distal end of a first adjusting bolt 56 that passes horizontally through the upper position of the rear cover 43 and is prevented from moving in the axial direction and allowed to rotate in the circumferential direction by a nut 54 and a lock-washer 55, so that the first movable nut 53 moves axially of the first adjusting bolt 56 upon rotation of the first adjusting bolt 56. Thus, the first stay 49 swings in the fore-and-aft direction about the supporting portion of the supporting nut 50 that serves as a fulcrum with respect to the supporting volt 52 to tilt the reflector 46 in the vertical direction.

Figure 10:
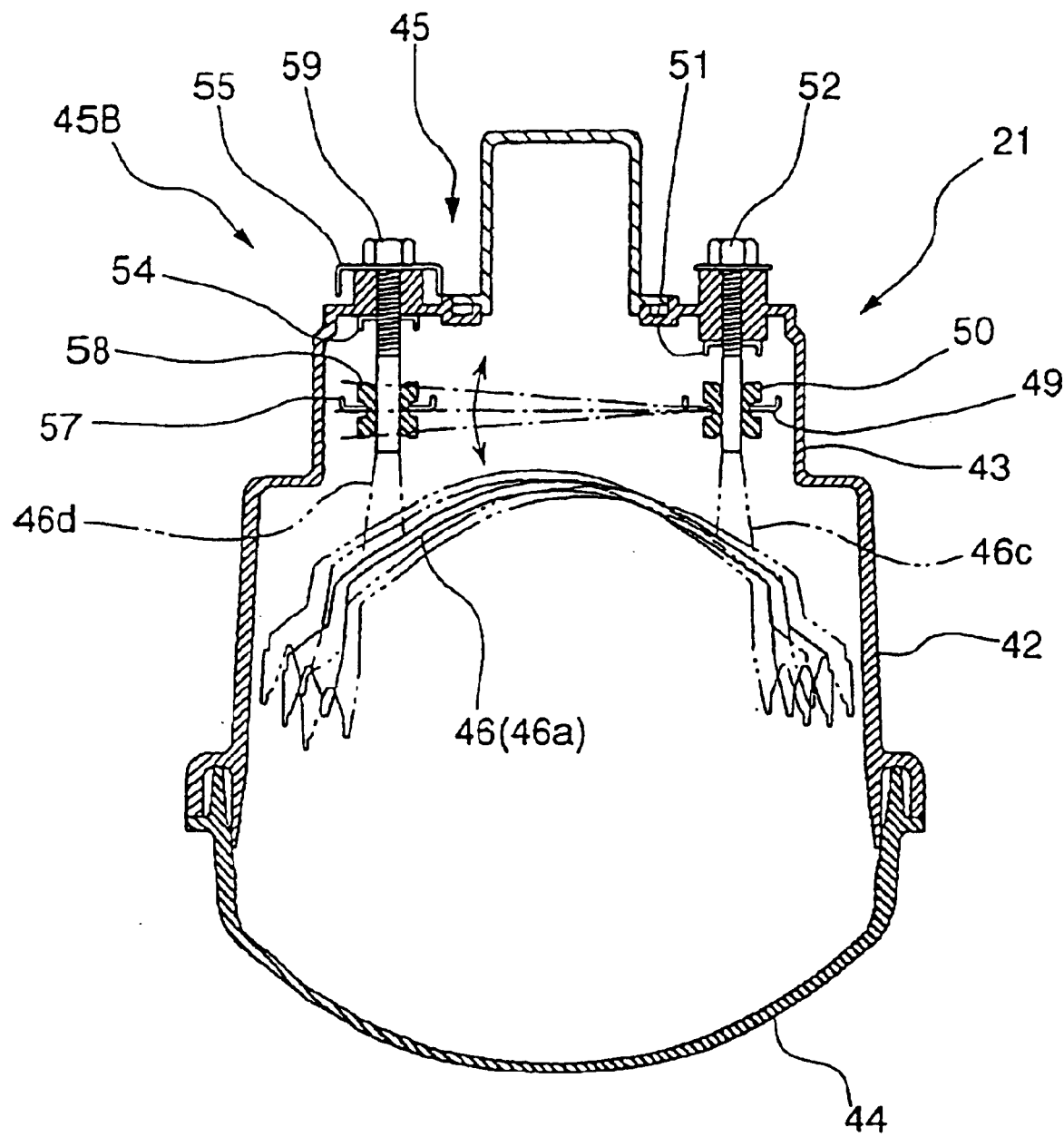
FIG. 10 is an enlarged cross-sectional view taken along the line 10—10 in FIG. 4.
Figure 11:
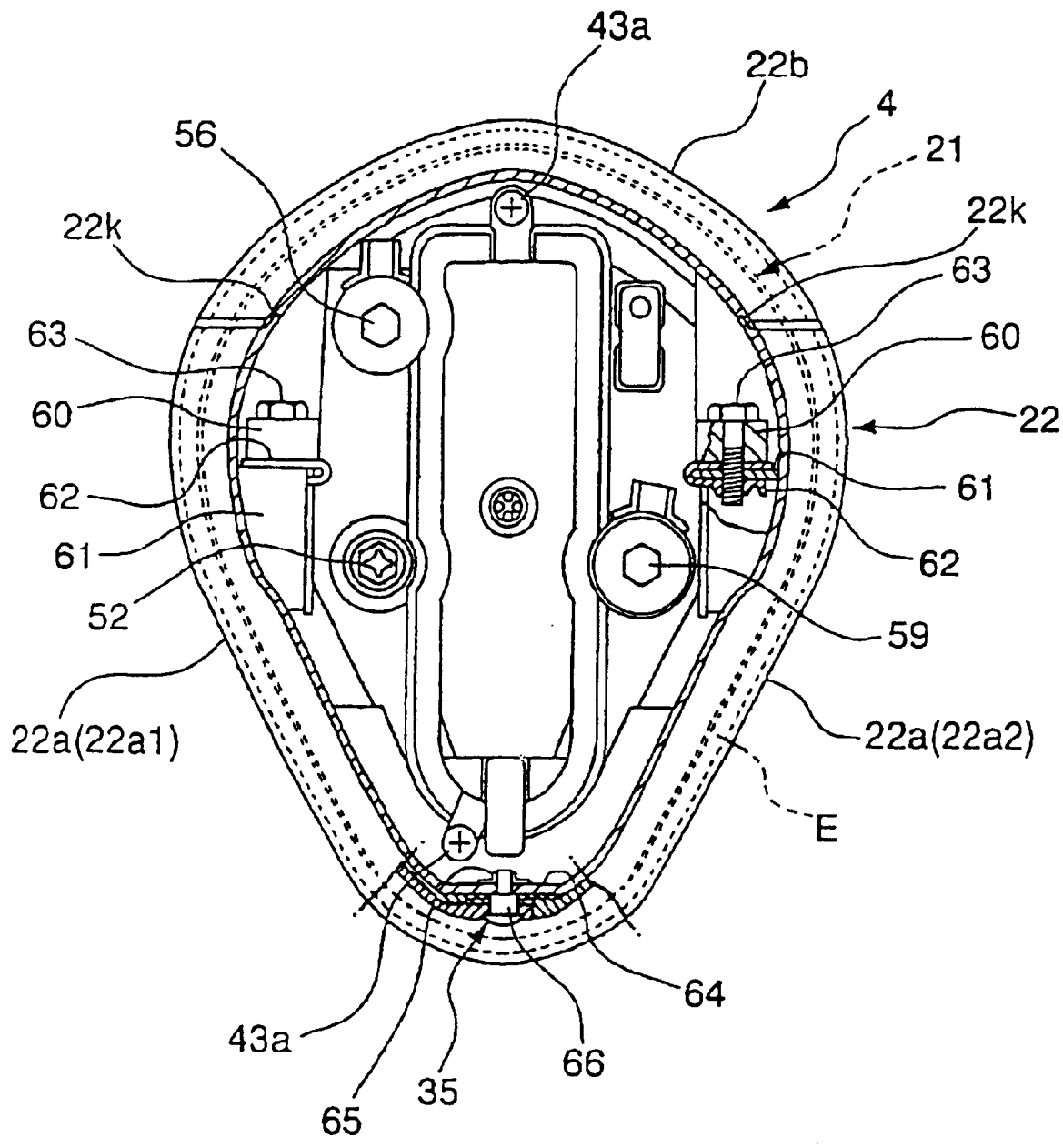
FIG. 11 is an enlarged cross-sectional view taken along the line 11—11 in FIG. 3.

The second aiming adjusting unit 45B is constructed in such a manner that, as shown in FIG. 10, the second movable nut 58 is fixed to a second stay 57 secured to a projection 46d and formed on the other side (left side in FIG. 10) of the rear face of the reflector 46 (upper reflecting portion 46a) with a bolt that is engaged with the distal end of the second adjusting bolt 59 that passes horizontally through the lower position (the same level with the supporting bolt 52) of the rear cover 43 and is prevented from moving in the axial direction and allowed to rotate in the circumferential direction by the nut 54 and the locking washer 55, so that the second movable nut 58 moves axially of the second adjusting bolt 59 upon rotation of a second adjusting bolt 59. Thus, the reflector 46 tilts in the lateral direction about the supporting portion of the supporting nut 50 that serves as a fulcrum with respect to the supporting bolt 52 via the second stay 57, the projection 46d, the projection 46c, and the first stay 49, accordingly. The supporting nut 50, and the first and the second adjusting bolts 56, 59 are formed of soft synthetic resin material so as to allow swinging movement of the first and the second stays 49, 57 without problem.

The headlight unit 22 constructed as described above is formed with leg portions 60, 60 projecting toward both sides of the housing 42 at the level slightly higher than the middle stage on the rear side. The leg portions 60, 60 are placed on mounting eyes 61, 61 fixed on the inner wall on both sides of the lower case 22a of the headlight case 22, and fixed to the mounting eyes 61, 61 by a nut 62 that also serves as a locking washer and a bolt 63 engaging thereto (See FIG. 3 and FIG. 11). A nut 65, which also serves as a locking washer, is mounted on a mounting plate portion 64 provided at the center of the lowest portion at the rear end of the housing 42. A bolt 66 is passed through the overlapped portions of the halves 22a1, 22a2 of the lower case 22a from below into the inside thereof is engaged with the nut 62 at the mounting portion 35 of the lower case 22a, so that the front face of the lens 44a is supported by the lower case 22a in a state of being exposed toward the outside from the opening 22c on the front face of the headlight case 22. The gap E is formed between the headlight unit 21 and the headlight case 22.

When assembling the headlight apparatus 4, the lower case 22a formed integrally by welding the halves 22a1, 22a2 is fixed first to the stay 26 with the bolt 27 and the nut 28, and then the headlight unit 21 is mounted to the lower case 22a by fixing the leg portions 60, 60 to the mounting eyes 61, 61 with the bolt 63 and the nut 62, and fixing the mounting plate portion 64 to the mounting portion 35 at the bottom of the lower case 22 with the bolt 66 and the nut 65. Subsequently, the upper case 22b is fixed by engaging the pin 32 at the front end with the front end of the lower case 22a and fixing the mounting portion 34 at the rear end and the mounting strip 30 of the lower case 22a to the stay 26 with the bolt 31a and the nut 31b. Then, the cover 39 is fixed to the stay 26 by the bolt 40. In this way, the headlight apparatus 4 may easily be assembled according to such a simple assembling procedure. The lower case 22a may be formed as a single unit from the beginning instead of forming it integrally by welding the halves 22a1, 22a2.

According to the headlight apparatus 4, when the motorcycle 1 is operated, air flowing along the headlight case 22 enters into the headlight case 22 through the intake ports 36a, 36b of the lower case 22a, passes through the gap E alongside the headlight unit 21 and the headlight case 22 and a space E1 at the rear of the headlight unit 21, and is discharged from the exhaust port 34g formed at the rear end of the upper case 22b of the headlight case 22 into the cover 39. During this time, air entered into the headlight case 22 removes heat generated by lighting of the headlight bulbs 20a, 20b of the headlight unit 21. Thus, the headlight unit 21 can effectively be cooled. At this time, since air introduced into the headlight case 22 passes alongside the outer periphery of the headlight unit 21 and is discharged from the exhaust port 34g, the outer periphery of the headlight unit 21 is extensively cooled. Thus, the cooling efficiency of the headlight is improved.

When replacing the headlight unit 21 or performing an aiming adjustment of the headlight bulbs 20a, 20b of the headlight unit 21, the bolt 40 is removed to dismount the cover 39 from the stay 26, the bolt 31a is removed to disconnect the rear end of the upper cover 22b and the stay 26, and then the upper cover 22 is shifted forward to release engagement of the pin 32 and the lower cover 22a to dismount from the lower cover 22a.

Consequently, the top of the lower cover 22a is opened. The headlight unit 21 may be replaced by removing the bolts 63, 63 to release fixation of the leg portions 60, 60 of the headlight unit 21 to the mounting eyes 61, 61 of the lower cover 22a, removing the bolt 66 to release fixation of the mounting plate portion 64 of the headlight unit 21 to the lower case 22a, dismounting the headlight unit 21 by lifting it out of the lower case 22a, placing a new headlight unit 21 in the lower case 22a by inserting into the lower case 22a downwardly from above according to a reverse procedure to removing the headlight unit as described above, and fixing it to the lower case 22a. This mounting and dismounting procedure requires fewer variations in posture of the operator, and thus the operator can perform this procedure easily, which reduces the burden of the operator.

The aiming of the headlight bulbs 20a, 20b may be adjusted by inserting a spanner or the like from above the lower case 22a in a state in which the headlight unit 21 is attached to the lower case 22a, rotating one or both of the first adjusting bolt 56 and the second adjusting bolt 59 as needed, and tilting the reflector 46 vertically and laterally to adjust the direction of radiation of the headlight bulbs 20a, 20b as needed.

The aiming adjustment may be performed easily for the embedded headlight unit 21 by removing the upper case 22b from the lower case 22a as needed as well as the case in which the headlight unit 21 is replaced with a new headlight unit 21.

As described above, since the intake ports 36a, 36b for introducing air for cooling the headlight unit 21 into the headlight case 22 are formed at the bottom (underside) of the headlight case 22 and the exhaust port 34g for discharging air introduced into the headlight case 22 is formed on the mounting portion at the upper rear end of the headlight case 22 for the stay 39, the intake ports 36a, 36b and the exhaust port 34g are not especially noticeable when viewed from the outside. Hence, the appearance of the headlight case 22 may be improved. In addition, cables that bundle wiring for supplying power to the headlight unit 21 or wiring for controlling lighting are arranged in the cover 39 for covering the stay 26, which allows the headlight unit 21 (headlight case 22) to be supported by the link type front suspension 3 of the motorcycle 1. The cables are not exposed in the vicinity of the headlight case 22. Thus, the cables are not noticeable from the appearance, which also contributes to an improvement in the appearance.

As described thus far, according to the present invention, the following advantages are achieved.

With a headlight apparatus according to the present invention, the headlight case includes an intake port for introducing air into the headlight case and an exhaust port for exhausting introduced air. The headlight case encloses a headlight unit in close vicinity thereto with a gap between the headlight case and the headlight unit that forms an air introduction path for introducing air from the intake port to the exhaust port. Therefore, the headlight unit can effectively be cooled by air flowing from the inlet port through the air introduction path toward the exhaust port. In this case, since outside air taken into the headlight case passes along the entire surface of the outer periphery of the headlight unit and is discharged from the exhaust port, the outer periphery of the headlight unit is cooled extensively. Thus, the cooling efficiency is improved. In addition, since the gap between the headlight case and the headlight unit is used as the air introduction path, it is not necessary to provide a special component for forming the air introduction path, whereby the number of components of the apparatus may be reduced and, simultaneously, the assembling property for assembling the apparatus may be improved.

With a headlight apparatus according to the present invention, since the headlight case is constructed of two halves including an upper case and a lower case, the headlight unit can be mounted to and dismounted from the headlight case by dismounting the upper case from the lower case, whereby the replacement or the aiming adjustment of the headlight unit can easily be performed.

With a headlight apparatus according to the present invention, since the headlight unit is mounted to the lower case by being inserted through an opening formed on the top thereof, the headlight unit can easily be mounted to and dismounted from the headlight case from above thereof in a state in which the upper case is dismounted from the lower case. In this case, variations in posture of the operator may be reduced. Thus, the operational burden may be reduced.

With a headlight apparatus according to the present invention, since the intake port is formed on the bottom of the headlight case, and the exhaust port is formed on a mounting portion on the upper portion of the headlight case for mounting the same to a front frame, the intake port and the exhaust port are not located at the positions that are particularly noticeable when viewed from the outside of the headlight case, whereby the appearance of the headlight case may be improved.

With a headlight apparatus according to the present invention, since the exhaust port is formed substantially at a position facing the intake port on the headlight case, outside air introduced through the intake port can easily be exhausted from the exhaust port along the entire surface of the outer periphery of the headlight case.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A headlight apparatus including a headlight unit having a head light bulb stored therein, and a headlight case attached on a front frame of a two wheel vehicle for accommodating said head light unit therein, comprising:

an intake port formed in the headlight case for introducing air into the headlight case;

an exhaust port formed at a position remote from the intake port for exhausting air in the headlight case, said headlight case enclosing said headlight unit in close vicinity thereto; and a gap between said headlight case and said headlight unit forms an air introduction path for introducing air from said intake port to the exhaust port.

2. The headlight apparatus according to claim 1, wherein said headlight case is constructed of two halves including an upper case and a lower case.

3. The headlight apparatus according to claim 2, wherein said headlight unit is mounted to said lower case by being inserted through an opening formed on a top thereof.

4. The headlight apparatus according to claim 1, wherein said intake port is formed on a bottom of said headlight case, and said exhaust port is formed on a mounting portion on an upper portion of said headlight case for mounting the same to said front frame.

5. The headlight apparatus according to claim 2, wherein said intake port is formed on a bottom of said headlight case, and said exhaust port is formed on a mounting portion on an upper portion of said headlight case for mounting the same to said front frame.

6. The headlight apparatus according to claim 3, wherein said intake port is formed on a bottom of said headlight case, and said exhaust port is formed on a mounting portion on an upper portion of said headlight case for mounting the same to said front frame.

7. The headlight apparatus according to claim 1, wherein said exhaust port is formed substantially at a position facing said intake port on the headlight case.

8. The headlight apparatus according to claim 2, wherein said exhaust port is formed substantially at a position facing said intake port on the headlight case.

9. The headlight apparatus according to claim 3, wherein said exhaust port is formed substantially at a position facing said intake port on the headlight case.

10. A headlight apparatus comprising:
  a headlight unit having a head light bulb positioned therein;
  a headlight case adapted to be attached to a vehicle for accommodating said head light unit therein;
  an intake port for introducing air into the headlight case;
  an exhaust port disposed at a predetermined position remote from the intake port for exhausting air in the headlight case, said headlight case enclosing said headlight unit in close vicinity thereto; and
  a gap formed between said headlight case and said headlight unit for forming an air introduction path for introducing air from said intake port to the exhaust port,
  wherein said exhaust port is formed substantially at a position facing said intake port on the headlight case.

11. The headlight apparatus according to claim 10, wherein said headlight case is constructed of two halves including an upper case and a lower case.

12. The headlight apparatus according to claim 11, wherein said headlight unit is mounted to said lower case by being inserted through an opening formed on a top thereof.

13. The headlight apparatus according to claim 10, wherein said intake port is formed on a bottom of said headlight case, and said exhaust port is formed on a mounting portion on an upper portion of said headlight case.

14. The headlight apparatus according to claim 11, wherein said intake port is formed on a bottom of said headlight case, and said exhaust port is formed on a mounting portion on an upper portion of said headlight case.

15. The headlight apparatus according to claim 12, wherein said intake port is formed on a bottom of said headlight case, and said exhaust port is formed on a mounting portion on an upper portion of said headlight case.

16. The headlight apparatus according to claim 10, wherein the headlight case is mounted on a front frame of the vehicle, the vehicle being a motorcycle.

17. The headlight apparatus according to claim 11, wherein the headlight case is mounted on a front frame of the vehicle, the vehicle being a motorcycle.

18. The headlight apparatus according to claim 12, wherein the headlight case is mounted on a front frame of the vehicle, the vehicle being a motorcycle.

19. A headlight apparatus comprising:
  a headlight unit adapted for mounting at least one headlight;
  a headlight case adapted to be attached to a vehicle for accommodating said head light unit therein;
  said headlight case being constructed of two halves including an upper case and a lower case;
  an intake port for introducing air into the headlight case, said intake port being formed in said lower case;
  an exhaust port disposed at a predetermined position remote from the intake port for exhausting air in the headlight case; and
  a gap formed between said headlight case and said headlight unit for forming an air introduction path for introducing air from said intake port to the exhaust port.

20. The headlight apparatus according to claim 19, wherein said headlight unit is mounted to said lower case by being inserted through an opening formed on a top thereof.

* * * * *